Figure 1:
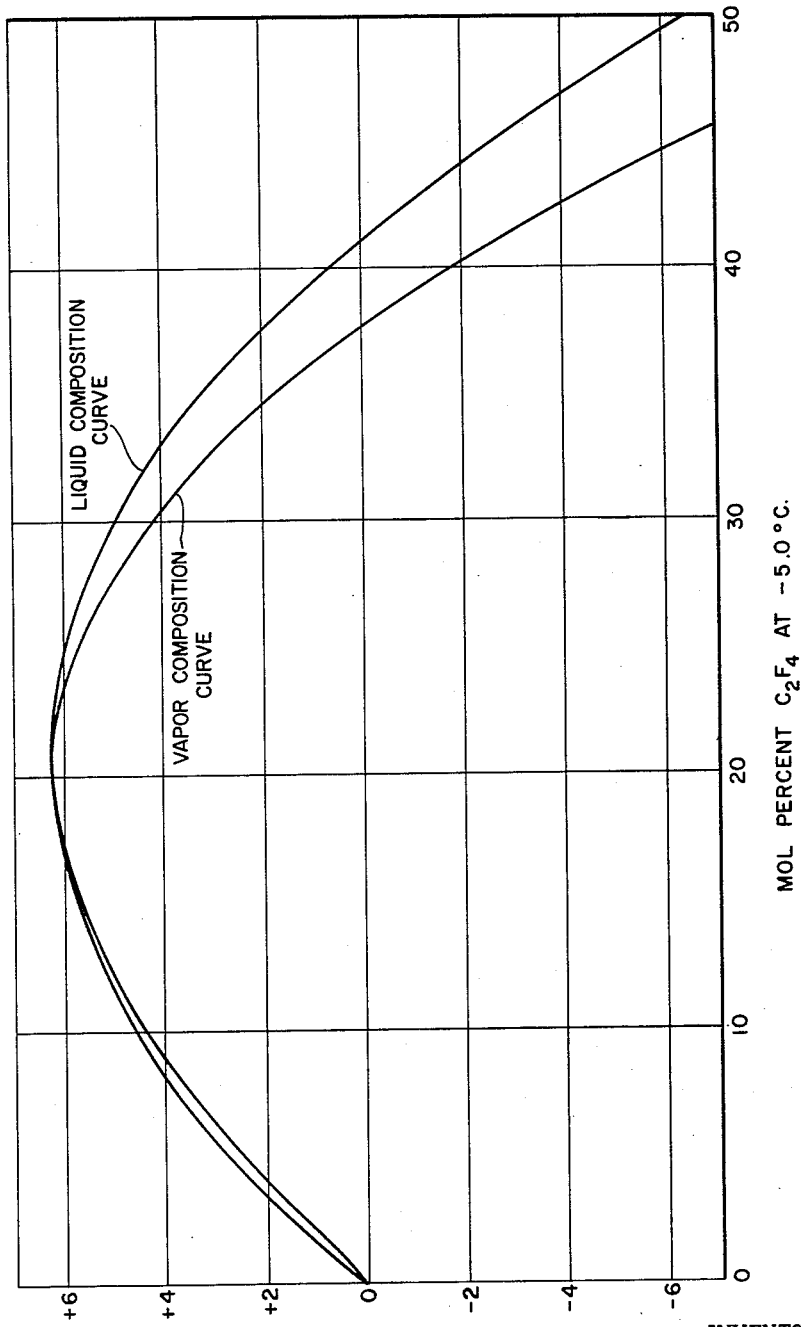

United States Patent Office 3,152,051
Patented Oct. 6, 1964

3,152,051
SEPARATION OF A MIXTURE CONTAINING TETRAFLUOROETHYLENE AND FLUOROFORM BY EXTRACTIVE DISTILLATION
Arnold H. Fainberg, Elkins Park, David S. Fetterman, Willow Grove, and Murray Hauptschein, Glenside, Pa., assignors to Pennsalt Chemicals Corporation, Philadelphia, Pa., a corporation of Pennsylvania
Filed Mar. 12, 1962, Ser. No. 178,970
17 Claims. (Cl. 202—39.5)

This invention relates to the separation of mixtures of fluoroform and tetrafluoroethylene, and is particularly concerned with the separation of mixtures of these compounds obtained by the pyrolysis of fluoroform.

The pyrolysis of fluoroform to produce fluorocarbons, particularly the perfluoroolefins tetrafluoroethylene and hexafluoropropene, is described in U.S. Patent 3,009,966 of Murray Hauptschein and Arnold H. Fainberg. When the pyrolysis is carried out under conditions to produce tetrafluoroethylene, the raw pyrolysate will consist of a mixture of tetrafluoroethylene (B.P. −76° C. at 760 mm.) and unreacted fluoroform (B.P. −82°C. at 760 mm.) as well as other fluorocarbon products. The molar ratio of tetrafluoroethylene to fluoroform in the pyrolystate generally ranges from 1:8 to 8:1 as the total fluoroform conversion during the pyrolysis ranges from 20 to 95%. The tetrafluoroethylene, of course, must be separated from unreacted fluoroform (which is recycled to the reactor) and from other products formed during the pyrolysis.

It has now been found that while tetrafluoroethylene and fluoroform may be readily separated by simple fractional distillation from the higher boiling pyrolysis products such a hexafluoropropene (boiling point −29° C. at 760 mm. Hg) and various $C_4$ compounds formed in small amounts, it is not possible to separate tetrafluoroethylene from fluoroform in this manner. It has been discovered that these compounds form a minimum boiling azeotrope which has a composition varying between about 30 mol percent tetrafluoroethylene at atmospheric pressure to about 17 mol percent tetrafluoroethylene at a pressure of 610 lbs./in.$^2$ absolute. It is, of course, impossible to obtain any separation of the two components in the region of the azetrope by ordinary fractional distillation. Other methods often employed for the separation of liquids have also proved impossible or impracticable. Since the binary system $C_2F_4$—$CHF_3$ forms homogenous liquid mixtures over any practicable range of temperatures, separation by decantation is not possible. Fractional crystallization, liquid-liquid extraction, absorption and adsorption are also impracticable. Finally, it has been found that "breaking" the azeotrope by distillation at different pressures is not practicable since the azeotropic composition shifts very slowly with change in temperature.

In accordance with the present invention it has been discovered that mixtures of tetrafluoroethylene and fluoroform may be readily and economically separated from one another by fractionally distilling the mixture in the presence of an aliphatic perhalocarbon which has an atmospheric boiling temperature between −40° and +100° C. and preferably −35° C. to +50° C. and in which the halogens are selected from the class consisting of chlorine and fluorine. As will be shown in detail in the subsequent description it has been found that such perhalocarbons markedly increase the relative volatility of fluoroform with respect to tetrafluoroethylene such that, when the distillation is carried out in the presence of such materials, separation of tetrafluoroethylene from fluoroform may be carried out to any desired degree by fractional distillation. Since in this system the perhalocarbon has the effect of preferentially rejecting the fluoroform from the ternary liquid mixture and preferentially retaining tetrafluoroethylene, the perhalocarbon may be referred to as an extractant and the process of so employing it as an extractive distillation. As will be seen, the use of the perhalocarbon hexafluoropropene is particularly preferred as the extractant for the separation of mixtures of tetrafluoroethylene and fluoroform as they are obtained in the pyrolysate produced by the pyrolysis of fluoroform.

THE BINARY SYSTEM $CF_3H$—$C_2F_4$

As stated previously, it has been discovered that tetrafluoroethylene and fluorform form a series of azeotropes which vary slowly in composition with temperature. Table I shows the azeotropic composition obtained by vapor-liquid equilibria measurements at various temperatures ranging from −85°C. (boiling point at atmospheric pressure) to +20° C. which is in the neighborhood of the critical temperature of both $C_2F_4$ (+33° C.) and $CHF_3$ (+26° C.). Also shown in Table I is the vapor pressure of the azeotrope at the various temperatures and the corresponding vapor pressures of $CHF_3$ and $C_2F_4$ as pure compounds. As may be seen, the azeotropes formed are minimum boiling (maximum pressure) azeotropes, there being in all cases a positive pressure differential betwen the azeotrope and the more volatile component fluoroform.

Table I
AZEOTROPIC COMPOSITIONS OF THE BINARY $C_2F_4$—$CHF_3$ AT VARIOUS TEMPERATURES

| Temp., ° C. | Azeotropic composition, mol. percent $C_2F_4$ | Vapor pressure, p.s.i.a. | | | Vapor pressure differential between azeotrope and pure $CHF_3$ |
|---|---|---|---|---|---|
| | | Azeotrope | $CHF_3$ | $C_2F_4$ | |
| +20.0 | 17 | 611 | 603 | 430 | 7.7 |
| +15.0 | 17.5 | 543 | 536 | 382 | 7.3 |
| +10.0 | 18 | 481 | 474 | 338 | 7.0 |
| +5.0 | 18.5 | 426 | 419 | 298 | 6.7 |
| 0.0 | 20 | 374 | 368 | 261 | 6.5 |
| −5.0 | 21 | 328 | 322 | 228 | 6.1 |
| −85 [1] | 30 | 14.7 | | | |

[1] Approx.

The azeotrope formation at −5° C. is shown in FIGURE 1 of the drawings which shows the vapor and liquid composition of the binary mixture $C_2F_4$—$CHF_3$ at equilibrium conditions at −5° C. as a function of the pressure differential between the vapor pressure of the azeotrope and that of pure fluoroform. As may be seen, a maximum pressure azeotrope is formed containing about 21% tetrafluoroethylene. It is also apparent that in the composition range of from 0 to 30% tetrafluoroethylene in the binary, there is little difference in the vapor and liquid composition, there being no difference of course, at the azeotrope. It is thus apparent that in this range even partial separation of the binary by ordinary fractional distillation is difficult and that complete separation is impossible.

Reference is now made to Table II which shows the variation of the relative volatility of fluoroform with respect to tetrafluoroethylene as a function of temperature and composition. The relative volatility of fluoroform with respect to tetrafluoroethylene, expressed by the symbol $$\alpha^{CHF_3}_{C_2F_4}$$

is defined as follows:

$$\alpha^{CHF_3}_{C_2F_4} = \frac{(y_a)(x_b)}{(y_b)(x_a)}$$

where, at equilibrium conditions, at a given temperature, pressure, and liquid composition, $y_a$ and $x_a$ are respectively the mole fraction of fluoroform in the vapor and the mole fraction of fluoroform in the liquid, and where $y_b$ and $x_b$ are respectively the mole fraction of tetrafluoroethylene in the vapor and the mole fraction of tetrafluoroethylene in the liquid. The relative volatility, as thus defined is a quantitative measure of the degree of separation of the two components theoretically obtainable for a single plate of distillation at equilibrium.

If the $$\alpha^{CHF_3}_{C_2F_4}$$

is greater than unity at a given temperature and liquid composition, the molar ratio of fluoroform to tetrafluoroethylene is greater in the vapor phase than in the liquid with which it is in equilibrium. When $$\alpha^{CHF_3}_{C_2F_4}$$

is less than unity, the converse is true. When $$\alpha^{CHF_3}_{C_2F_4}$$

is unity, the vapor and the liquid have the same composition, i.e., an azeotrope is formed.

In Table II the relative volatility $$\alpha^{CHF_3}_{C_2F_4}$$

is shown for the binary mixture $C_2F_4$—$CHF_3$ for liquid compositions ranging from 3.1% to 52.2% $C_2F_4$ and at temperatures ranging from −5° C. to +20° C. in 5° C. intervals. As may be seen, in each case, the relative volatility $$\alpha^{CHF_3}_{C_2F_4}$$

varies from slightly below unity to slightly above unity as the $C_2F_4$ content of the binary varies from 0 to about 40%. It is only after the $C_2F_4$ concentration is above about 40 mole percent that the relative volatility is sufficiently high to permit some practical separation of $C_2F_4$ from the mixture by fractional distillation.

Figure 2:
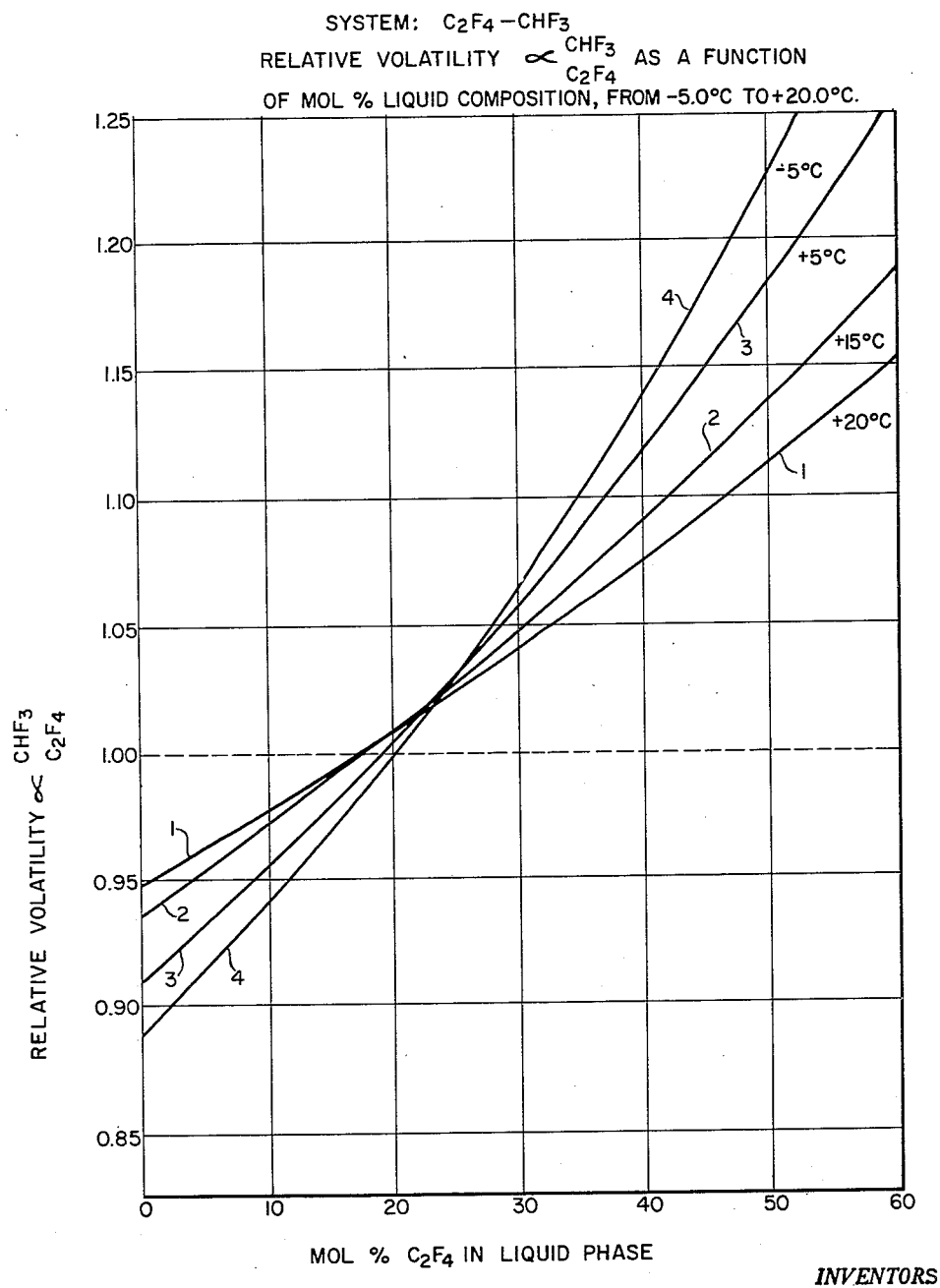

Reference is made to FIGURE 2 of the drawing which shows the data of Table II in graphical form. Curves 1, 2, 3 and 4 show the relative volatility $$\alpha^{CHF_3}_{C_2F_4}$$

at temperatures of +20° C., +15° C., +5° C. and −5° C. respectively as a function of liquid composition. As is apparent, the curves pass through $$\alpha^{CHF_3}_{C_2F_4} = 1$$

(indicated by the dotted line 5) at approximately 17–21 mole percent $C_2F_4$ in the binary, indicating azeotrope formation in this region. The increasing slopes of the curves as the temperature decreases indicates a more rapid rate of change of relative volatility with respect to liquid composition at decreasing temperatures.

Table II

RELATIVE VOLATILITY $\alpha^{CHF_3}_{C_2F_4}$ IN THE BINARY $C_2F_4$—$CHF_3$ AS A FUNCTION OF TEMPERATURE AND COMPOSITION

| Liquid Composition, mol. percent $C_2F_4$ | α at +20.0 °C. | α at +15.0 °C. | α at +10.0 °C. | α at +5.0 °C. | α at 0.0 °C. | α at −5.0 °C. |
|---|---|---|---|---|---|---|
| 3.1 | 0.955 | 0.946 | 0.934 | -------- | 0.097 | 0.904 |
| 5.9 | 0.963 | 0.957 | 0.944 | 0.935 | -------- | -------- |
| 7.3 | -------- | -------- | -------- | -------- | 0.931 | 0.924 |
| 9.1 | 0.972 | 0.966 | 0.964 | 0.951 | 0.946 | -------- |
| 16.8 | 0.999 | 0.997 | 0.994 | 0.991 | 0.980 | -------- |
| 21.8 | 1.011 | -------- | -------- | -------- | -------- | -------- |
| 24.6 | 1.017 | -------- | -------- | -------- | -------- | -------- |
| 27.0 | 1.025 | -------- | -------- | -------- | -------- | -------- |
| 30.8 | -------- | -------- | -------- | -------- | 1.060 | -------- |
| 31.0 | 1.044 | 1.043 | 1.053 | 1.058 | -------- | -------- |
| 41.5 | 1.078 | 1.098 | 1.123 | 1.131 | 1.137 | 1.162 |
| 50.2 | -------- | -------- | -------- | -------- | -------- | 1.220 |
| 52.2 | -------- | -------- | -------- | -------- | -------- | 1.246 |

THE TERNARY SYSTEM: $C_2F_4$—$CHF_3$-PERHALOCARBON EXTRACTANT

In contrast to the behavior of the binary system $C_2F_4$—$CHF_3$ which, as shown by the data presented above, displays azeotrope formation at any practicable range of distillation temperatures and in addition displays relative volatilities close to unity over a wide range of composition, the ternary system $C_2F_4$—$CHF_3$-perhalocarbon extractant, where the perhalocarbon extractant is as herein defined, provides markedly increased relative volatilities $$\alpha^{CHF_3}_{C_2F_4}$$

permitting the azeotrope to be completely bypassed, and in general greatly facilitating separation of these compounds by fractional distillation.

As stated previously, the suitable perhalocarbon extractants of the invention are aliphatic compounds consisting only of carbon and halogen having atmospheric boiling temperatures between −40 and +100° C. and preferably −35° C. to +50° C. where the halogens are selected from the class consisting of fluorine and chlorine. Included in this group accordingly are perfluorocarbons (consisting only of carbon and fluorine); perchlorocarbons (consisting only of carbon and chlorine) and perfluorochlorocarbons (consisting only of carbon, fluorine and chlorine). As illustrated by the data which follow the perhalocarbon may be saturated or unsaturated, and may be cyclic or non-cyclic. Suitable extractants include, e.g., hexafluoropropene, perfluorobutenes (including perfluoroisobutylene; cis and trans perfluorobutene-2, and perfluorobutene-1), perfluorocyclobutane, perfluoropropane, perfluorobutane, perfluoropentane, $CF_3CCl_3$, $CF_2ClCFCl_2$, $CF_3CFCl_2$, $CF_2ClCF_2Cl$, $CF_3CF_2Cl$, $CF_2ClCCl_3$, $CFCl_2CFCl_2$, $CCl_2F_2$ $CCl_3F$ and $CCl_4$. For reasons that will appear in detail hereafter, hexafluoropropene is particularly useful as the extractant in the separation of tetrafluoroethylene from fluoroform as this compound is also found in pyrolysate from the pyrolysis of fluoroform.

THE TERNARY SYSTEM: $C_2F_4$—$CHF_3$—$C_3F_6$

The data of Table III derived from liquid-vapor equilibria taken at temperatures of −5° C., +5° C. and +15° C. illustrate the marked effect of hexafluoropropene on the relative volatility of fluoroform with respect to tetrafluoroethylene at varying ratios of $C_2F_4$ to $CHF_3$ and at $C_3F_6$ concentrations varying approximately from 50 to 60 mole percent. The concentration of $C_2F_4$ in the ternary mixture is expressed as its mole percent relative to the $C_2F_4+CHF_3$ content of the mixture. Thus, a concentration of 4.3% $C_2F_4$ relative to $C_2F_4+CHF_3$ represents a molar ratio of $C_2F_4$ to $CHF_3$ of 4.3:95.7 in the ternary mixture. If at this ratio of $C_2F_4$:$CHF_3$ the ternary contains a concentration of 57.1 mole percent $C_3F_6$ the ternary composition is 57.1 mole percent $C_3F_6$, 1.8 mole percent $C_2F_4$ and 40.3 mole percent $CHF_3$. The relative volatilities $$\alpha \frac{CHF_3}{C_3F_6} \text{ and } \alpha \frac{C_2F_4}{C_3F_6}$$

are also shown.

Table III

RELATIVE VOLATILE $\alpha \frac{CHF_3}{C_2F_4}$ IN THE TERNARY SYSTEM $C_2F_4$—$CHF_3$—$C_3F_6$ AS A FUNCTION OF RELATIVE $C_2F^4$ CONCENTRATION AT $C_3F_6$ CONCENTRATIONS OF ABOUT 50% TO 60%

| Temp., °C. | Pressure, p.s.i.a. | Mole percent $C_3F_6$ in the ternary | Mole percent $C_2F_4$ relative to $C_2F_4$+$CHF_3$ | $\alpha \frac{CHF_3}{C_2F_4}$ | $\alpha \frac{CHF_3}{C_3F_6}$ | $\alpha \frac{C_2F_4}{C_3F_6}$ |
|---|---|---|---|---|---|---|
| −5.0 | 171 | 58.2 | 0 | ---- | 4.91 | ---- |
|  | 171 | 57.1 | 4.3 | 1.30 | 5.09 | 3.92 |
|  | 176 | 54.5 | 14.5 | 1.35 | 5.18 | 3.82 |
|  | 179 | 50.0 | 34.9 | 1.41 | 5.04 | 3.57 |
|  | 165 | 49.2 | 62.3 | 1.61 | 5.80 | 3.58 |
|  | 123 | 60.0 | 86.5 | 1.83 | 6.91 | 3.79 |
|  | 120 | 55.3 | 100 | ---- | ---- | 3.60 |
| +5.0 | 217 | 59.0 | 0 | ---- | 4.37 | ---- |
|  | 217 | 57.8 | 4.3 | 1.27 | 4.34 | 3.42 |
|  | 222 | 55.0 | 14.5 | 1.32 | 4.36 | 3.31 |
|  | 200 | 57.8 | 35.0 | 1.42 | 4.53 | 3.20 |
|  | 180 | 61.8 | 55.5 | 1.55 | 5.08 | 3.28 |
|  | 165 | 60.5 | 76.6 | 1.66 | 5.60 | 3.39 |
|  | 160 | 59.7 | 86.5 | 1.72 | 5.77 | 3.34 |
|  | 153 | 57.2 | 97.0 | 1.85 | 6.13 | 3.31 |
|  | 154 | 55.8 | 100 | ---- | ---- | 3.22 |
| +15.0 | 269 | 59.6 | 0 | ---- | 3.74 | ---- |
|  | 270 | 58.4 | 4.3 | 1.26 | 3.76 | 2.99 |
|  | 273 | 56.5 | 14.9 | 1.32 | 3.74 | 2.84 |
|  | 219 | 62.1 | 55.7 | 1.49 | 4.35 | 2.91 |
|  | 209 | 60.2 | 76.8 | 1.62 | 4.72 | 2.90 |
|  | 201 | 59.8 | 86.5 | 1.71 | 4.92 | 2.88 |
|  | 193 | 58.4 | 97.0 | 1.78 | 5.25 | 2.96 |
|  | 196 | 56.4 | 100 | ---- | ---- | 2.76 |

A comparison of the data in Table III for the ternary system $C_2F_4$—$CHF_3$—$C_3F_6$ with the data in Table II for the binary system $C_2F_4$—$CHF_3$, demonstrates the marked effect of the presence of the $C_3F_6$ on the relative volatility $$\alpha \frac{CHF_3}{C_2F_4}$$

Whereas, the binary mixture forms azeotropes as the composition varies between 0 percent and 25 percent $C_2F_4$, no azeotropes are formed in the ternary mixture. Even at low concentrations of $C_2F_4$ relative to $CHF_3$ in the ternary, the relative volatilities $$\alpha \frac{CHF_3}{C_2F_4}$$

are sufficiently high to permit separation by fractional distillation under practicable conditions. Also to be noted is the increase of $$\alpha \frac{CHF_3}{C_2F_4}$$

with increasing concentration of $C_2F_4$ with respect to $CHF_3$ which facilitates the elimination of the last traces of $CHF_3$ when virtually $CHF_3$-free $C_2F_4$ is desired. The high relative volatilities $$\alpha \frac{CHF_3}{C_3F_6}$$

and $$\alpha \frac{C_2F_4}{C_3F_6}$$

indicate a facile separation of $CHF_3$ and $C_2F_4$ from $C_3F_6$.

Figure 3:
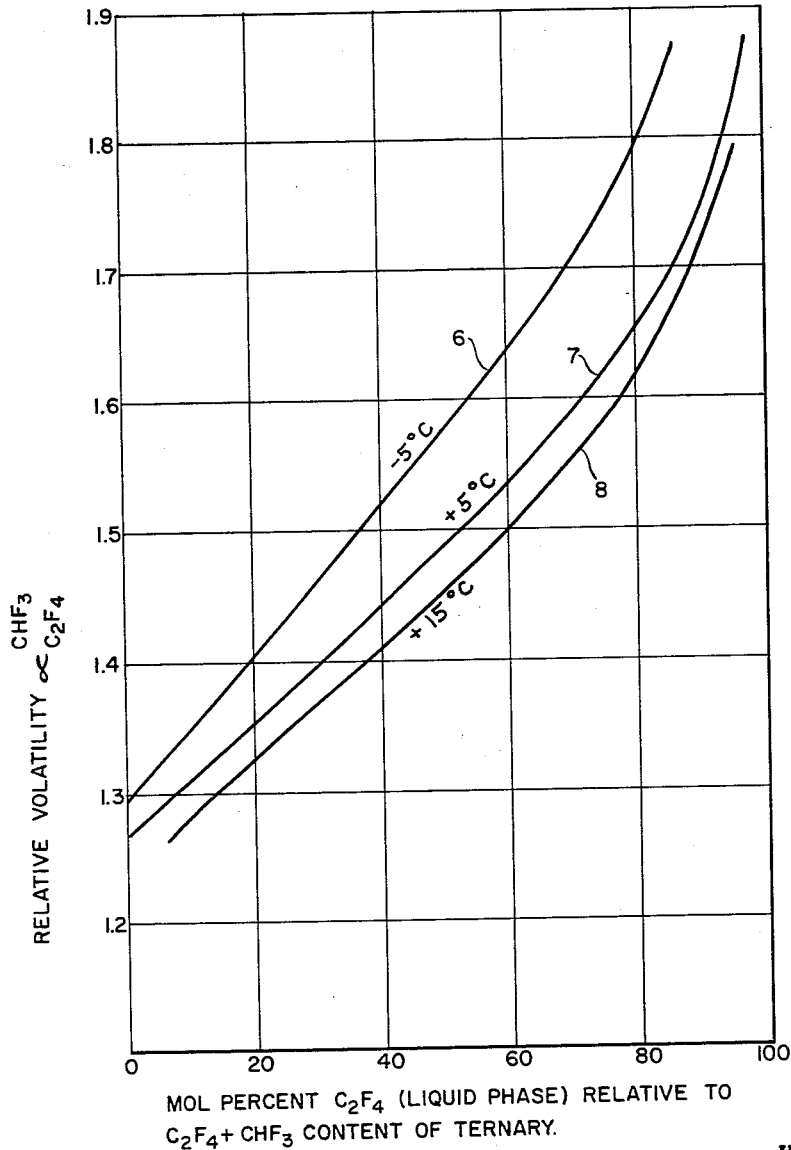

In FIGURE 3 of the drawings the relative volatility $$\alpha \frac{CHF_3}{C_2F_4}$$

is shown as a function of the concentration of $C_2F_4$ expressed as its mole percent relative to the $$C_2F_4 + CHF_3$$

content of the mixture at a constant concentration of 58.0 mole percent $C_3F_6$. Curves 6, 7 and 8 represent respectively the relative volatility $$\alpha \frac{CHF_3}{C_2H_4}$$

at −5° C. +5° C. and +15 °C. The effect of lower distillation temperatures in improving the relative volatility $$\alpha \frac{CHF_3}{C_2F_4}$$

is apparent from these curves.

Table IV shows the relative volatility $$\alpha \frac{CHF_3}{C_2F_4}$$

as a function of $C_3F_6$ concentration at a temperature of +5.0° C. and at a constant molar ratio of $C_2F_4$:$CHF_3$ of 6:94. These data indicate the $$\alpha \frac{CHF_3}{C_2F_4}$$

obtainable near the top of an extractive distillation column where the relative concentration of $C_2F_4$ with respect to $CHF_3$ is small.

Table IV

RELATIVE VOLATILITIES IN THE SYSTEM $C_2F_4$—CHF—$C_3F_6$ AS A FUNCTION OF $C_3F_6$ CONCENTRATION AT CONSTANT MOLAR RATIO OF $C_2F_4$:$CHF_3$ OF 6:94 AT +5.0° C.

| Weight Percent Liquid Composition | | | Pressure p.s.i.a. | $\alpha \frac{CHF_3}{C_2F_4}$ | $\alpha \frac{C_2F_4}{C_3F_6}$ | $\alpha \frac{CHF_3}{C_3F_6}$ |
|---|---|---|---|---|---|---|
| $C_3F_6$ | $CHF_3$ | $C_2F_4$ | | | | |
| 97.4 | 2.4 | 0.2 | 88 | 1.81 | 3.34 | 6.08 |
| 88.4 | 10.6 | 1.0 | 144 | 1.54 | 3.29 | 5.08 |
| 85.2 | 13.6 | 1.2 | 165 | 1.48 | 3.39 | 5.00 |
| 81.4 | 17.1 | 1.5 | 184 | 1.41 | 3.36 | 4.72 |
| 75.8 | 22.2 | 2.0 | 211 | 1.30 | 3.36 | 4.38 |
| 71.7 | 26.0 | 2.3 | 228 | 1.26 | 3.32 | 4.17 |

Figure 4:
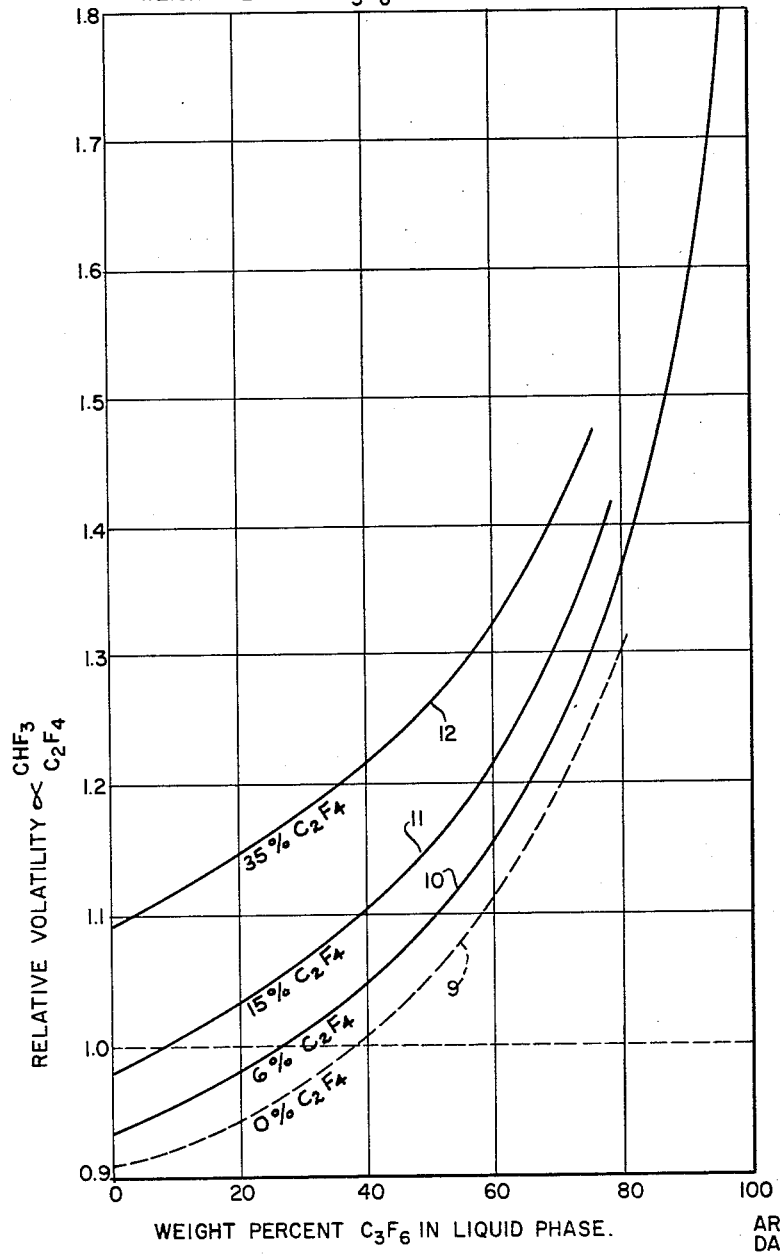

Reference is now made to FIGURE 4 where each of curves 9 through 12 show the relative volatility $$\alpha \frac{CHF_3}{C_2F_4}$$

as a function of $C_3F_6$ concentration in the ternary expressed as weight percent $C_3F_6$ at a temperature of +5° C. at a constant concentration of $C_2F_4$ with respect to $CHF_3$. The relative concentration of $C_2F_4$ (i.e., the mole percent concentration of $C_2F_4$ relative to the $C_2F_4$+$CHF_3$ content of the mixture) represented by each of the curves is 0% (extrapolated) for curve 9; 6% for curve 10; 15% for curve 11; and 35% for curve 12.

From the relationships shown in FIGURE 4, it is apparent that the weight percent concentration of $C_3F_6$ in the ternary during the distillation should be at least about 40% and preferably at least 50% in order to obtain $CHF_3$ with relatively low residual concentrations of, or substantially free from, $C_2F_4$. While the relative volatility $$\alpha \frac{CHF_3}{C_2F_4}$$

continues to increase with increasing $C_3F_6$ concentration, the liquid loading on the distillation column also increases with greater $C_3F_6$ concentrations, and for this reason the maximum $C_3F_6$ concentration in the ternary for practical operation will seldom exceed 95% (weight ratio of $C_3F_6:C_2F_4+CHF_3$ of 19:1) and in most cases will range between 50% and 85% by weight.

THE TERNARY SYSTEM $C_2F_6$—$CHF_3$-CYCLIC-$C_4F_8$

The effectiveness of perfluorocyclobutane in altering the relative volatility $$\alpha \frac{CHF_3}{C_2F_4}$$

is shown by the data in Table V derived from vapor liquid equilibria data on the system $C_2F_4$—$CHF_3$-c-$C_4F_8$ at a temperature of $+5°$ C. The relative volatilities $$\alpha \frac{CHF_3}{C_2F_4} \quad \alpha \frac{C_2F_4}{C_4F_8} \quad \text{and} \quad \alpha \frac{CHF_3}{C_4F_8}$$

are shown as a function of the concentration of c-$C_4F_8$ in the ternary at a constant molar ratio of $C_2F_4:CHF_3$ of 6:94.

Table V

RELATIVE VOLATILITIES IN THE SYSTEM $C_2F_4$—$CHF_3$-c-$C_4F_8$ AS A FUNCTION OF c-$C_4F_8$ CONCENTRATION AT CONSTANT $C_2F_4:CHF_3$ RATIO AT $+5.0°$ C.

| Weight percent liquid composition | | | Pressure p.s.i.a. | $\alpha \frac{CHF_3}{C_2F_4}$ | $\alpha \frac{C_2F_4}{C_4F_8}$ | $\alpha \frac{CHF_3}{C_4F_8}$ |
|---|---|---|---|---|---|---|
| c-$C_4F_8$ | $CHF_3$ | $C_2F_4$ | | | | |
| 94.9 | 4.6 | 0.5 | 102 | | 10.9 | |
| 90.2 | 8.9 | 0.9 | 154 | 1.62 | 8.3 | 13.4 |
| 86.1 | 12.6 | 1.3 | 188 | 1.51 | 7.5 | 11.4 |
| 79.3 | 18.9 | 1.8 | 233 | 1.40 | 6.8 | 9.6 |
| 74.6 | 23.2 | 2.2 | 258 | 1.36 | 6.2 | 8.4 |
| 69.1 | 28.2 | 2.7 | 277 | 1.31 | 6.0 | 7.9 |

Again it may be seen that the relative volatility $$\alpha \frac{CHF_3}{C_2F_4}$$

is markedly increased due to the presence of the c-$C_4F_8$ extractant over the values obtained for the binary mixture $C_2F_4$—$CHF_3$ in the absence of the extractant. Also note the high relative volatility of $C_2F_4$ and $CHF_3$ with respect to c-$C_4F_8$, indicating the ease with which these components may be stripped from the c-$C_4F_8$ extractant.

THE SYSTEM $C_2F_4$—$CHF_3$—$CCl_2FCClF_2$

The effectiveness of the extractant trichlorotrifluoroethane in altering the relative volatility $$\alpha \frac{CHF_3}{C_2F_4}$$

is demonstrated by the data in Table VI where $$\alpha \frac{CHF_3}{C_2F_4}$$

is shown as a function of the weight percent of $$CCl_2FCClF_2$$

in the ternary at a temperature of $+5°$ C. and at a constant molar ratio of $C_2F_4:CHF_3$ of 6:94. The corresponding relative volatility of $C_2F_4$ and $CHF_3$ with respect to $CClF_2CCl_2F$ is also shown.

Table VI

RELATIVE VOLATILITIES IN THE SYSTEM $C_2F_4$—$CHF_3$—$CCl_2FCClF_2$ AS A FUNCTION OF $CCl_2FCClF_2$ CONCENTRATION AT CONSTANT $C_2F_4:CHF_3$ RATIO AT $+5.0°$ C.

| Weight percent liquid composition | | | Pressure p.s.i.a. | $\alpha \frac{CH_3F}{C_2F_4}$ | $\alpha \frac{C_2F_4}{C_2Cl_3F_3}$ | $\alpha \frac{CHF_3}{C_2Cl_3F_3}$ |
|---|---|---|---|---|---|---|
| $C_2Cl_3F_3$ | $CHF_3$ | $C_2F_4$ | | | | |
| 80.7 | 17.5 | 1.8 | 237 | 1.65 | 48 | 79 |
| 72.7 | 25.0 | 2.3 | 277 | 1.45 | 46 | 67 |
| 64.5 | 32.5 | 3.0 | 300 | 1.37 | 32 | 44 |

Again, the marked increase in the $$\alpha \frac{CHF_3}{C_2F_4}$$

is shown as well as the very high relative volatilities of $C_2F_4$ and $CHF_3$ with respect to the extractant $CCl_2FCClF_2$.

THE SYSTEM $C_2F_4$—$CHF_3$—$CCl_4$

The data in Table VII illustrates the marked increase in relative volatility $$\alpha \frac{CHF_3}{C_2F_4}$$

in the presence of the extractant $CCl_4$. The relative volatility $$\alpha \frac{CHF_3}{C_2F_4}$$

is shown as a function of the weight percent of $CCl_4$ in the ternary at a temperature of $+5°$ C. and at a constant molar ratio of $C_2F_4:CHF_3$ of 6:94. The relative volatilities of $C_2F_4$ and $CHF_3$ with respect to $CCl_4$ are also shown.

Table VII

RELATIVE VOLATILITIES IN THE SYSTEM $C_2F_4$—$CHF_3$—$CCl_4$ AS A FUNCTION OF $CCl_4$ CONCENTRATION AT CONSTANT $C_2F_4:CHF_3$ RATIO AT $+5.0°$ C.

| Weight percent liquid composition | | | Pressure p.s.i.a. | $\alpha \frac{CH_3F}{C_2F_4}$ | $\alpha \frac{C_2F_4}{CCl_4}$ | $\alpha \frac{CHF_3}{CCl_4}$ |
|---|---|---|---|---|---|---|
| $CCl_4$ | $CHF_3$ | $C_2F_4$ | | | | |
| 83.1 | 15.1 | 1.8 | 374 | 1.68 | 212 | 356 |
| 79.8 | 18.0 | 2.2 | 374 | 1.59 | 173 | 275 |

Figure 5:
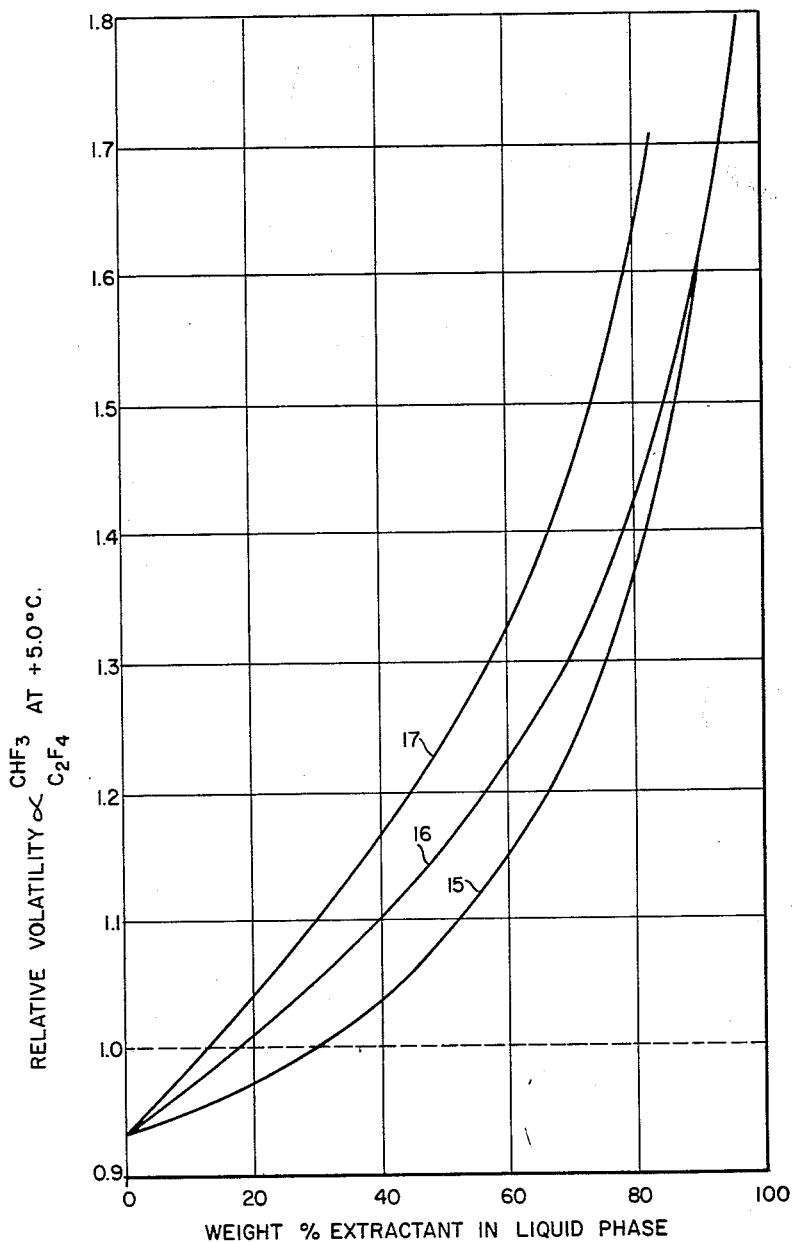

Reference is now made to FIGURE 5 of the drawings which for comparative purposes, shows the relative volatility $$\alpha \frac{CHF_3}{C_2F_4}$$

at $+5°$ C. and at a constant mole ratio of $C_2F_4:CHF_3$ in the ternary of 6:94, as a function of the weight percent extractant when using various extractants. Curve 15 represents this relationship when using $CF_2=CFCF_3$; curve 16 when using cyclo-$C_4F_8$ and curve 17 when using either of the extractants $CCl_2FCClF_2$ or $CCl_4$. The value for these last two extractants appear to follow substantially the same curve. As may be seen from the relationship shown in FIGURE 5, the effectiveness of the extractant in altering the relative volatility $$\alpha \frac{CHF_3}{C_2F_4}$$

at any given extractant concentration in the ternary mixture increases somewhat with the boiling point of the extractant. In any case, however, a minimum concentration of about 40 weight percent of the extractant is required to permit the separation of $C_2F_4$ from $CHF_3$ down to low residual concentrations of $C_2F_4$ under practicable conditions.

PREFERRED EXTRACTIVE DISTILLATION PROCEDURE

Figure 6:
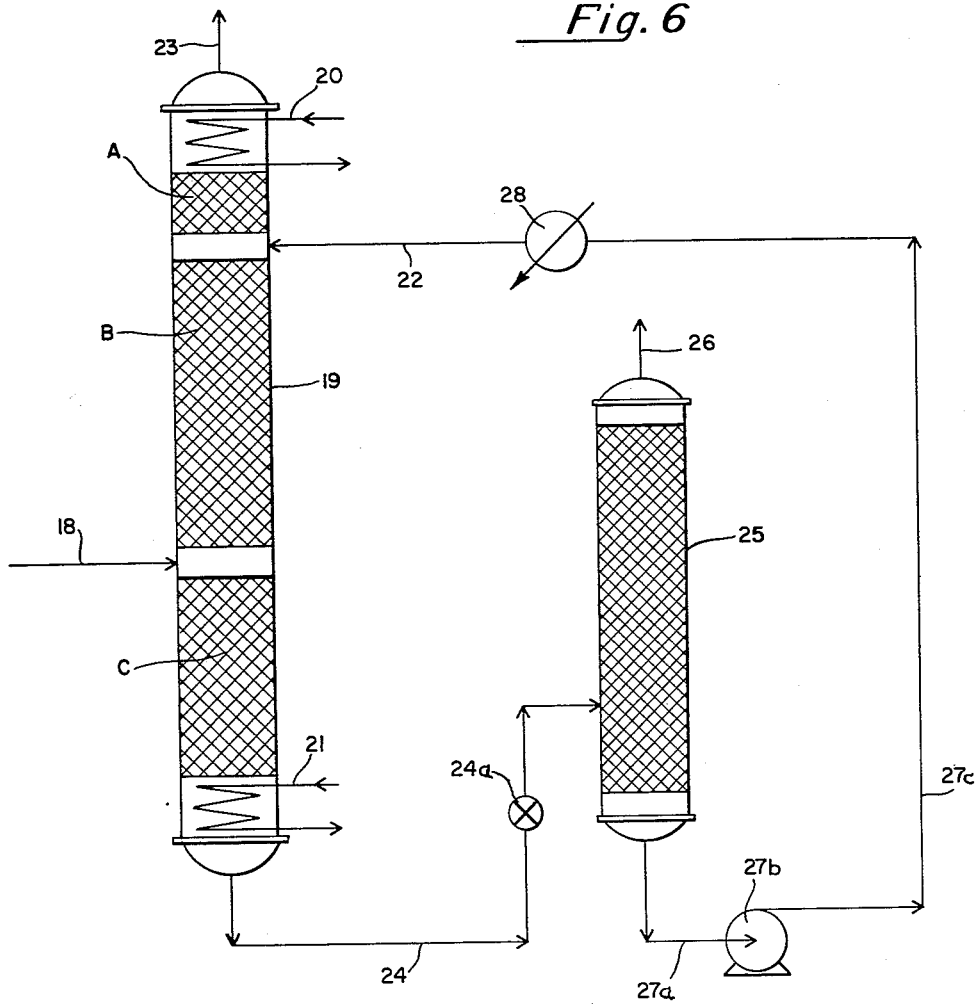

Reference is made to FIGURE 6 of the drawings which illustrates schematically the preferred method for separating the binary $C_2F_4$—$CHF_3$ by fractional distillation in the presence of the perhalocarbon extractant. A mixture of $C_2F_4$ and $CHF_3$ is introduced into the fractional distillation column 19 by line 18 at an intermediate level. In the system shown, the feed mixture entering by line 18 is assumed to contain substantially only $C_2F_4$ and $CHF_3$. However, the system may be readily modified to permit the separation of $C_2F_4$ and $CHF_3$ in the presence of other materials as will be shown hereinafter. The distillation column is equipped in the cross-hatched portions with plates or column packing (e.g., Berl saddles, Raschig rings, etc.) to insure intimate liquid-vapor contact. A suitable condenser 20 maintains the desired temperature (and corresponding column pressure) at the top of the column while a suitable reboiler 21 regulates the desired temperature and boil-up rate at the bottom of the column. The perhalocarbon extractant is introduced into column 19 near the top of the column by line 22. From the bottom of the column there is withdrawn a liquid mixture of $C_2F_4$ plus extractant which is essentially free from $CHF_3$, or at least substantially poorer in $CHF_3$ than the feed mixture entering by line 18. From the top of the tower there is withdrawn $CHF_3$ vapors by line 23 substantially free from $C_2F_4$ or at least substantially poorer in $C_2F_4$ than the feed mixture.

The bottoms from column 19 are fed to column 25 by line 24 and pressure let-down valve 24a where $C_2F_4$ is stripped from the extractant, leaving column 25 by line 26 as overhead while the extractant is withdrawn from the bottom of the column by line 27a and is recycled by recycle pump 27b, line 27c, cooler 28 and line 22 to the extractive distillation column 19.

In the extractive distillation column 19, a relatively short section A is provided above the point of introduction of the extractant to prevent the extractant from passing out of the column as overhead. Since the relative volatility of the $C_2F_4$ and $CHF_3$ with respect to the extractant is in all cases quite high, only a relatively short distillation section is necessary for this purpose. In section B, the descending extractant, through its effect in markedly increasing $$\alpha \frac{CHF_3}{C_2F_4}$$

in effect strips the $C_2F_4$ away from the $CHF_3$, the descending liquid thus becoming richer in $C_2F_4$ and the ascending vapors richer in $CHF_3$. The number of theoretical plates in section B will depend upon the average $$\alpha \frac{CHF_3}{C_2F_4}$$

in the presence of the extractant at the prevailing column pressure, and the desired degree of separation of the $CHF_3$ from $C_2F_4$. Since the average $$\alpha \frac{CHF_3}{C_2F_4}$$

in the presence of any of the extractants is well above unity, it is possible where desired to obtain virtually complete separation such that $CHF_3$ essentially free from $C_2F_4$ may be taken over as column overhead by suitably adjusting the number of plates in section B. If on the other hand, substantially pure $CHF_3$ is not desired, then the number of plates in section B may be correspondingly reduced such that the column overhead may contain varying amounts of, e.g., 1 to 5% $C_2F_4$.

In section C, the bottom portion of the column, the descending liquid mixture is progressively enriched in $C_2F_4$ and depleted in $CHF_3$. Since the relative volatility $$\alpha \frac{CHF_3}{C_2F_4}$$

increases rapidly with increasing concentrations of $C_2F_4$ in the presence of the extractant, essentially quantitative separation of the $C_2F_4$ from $CHF_3$ is possible such that the bottoms from the distillation column may be essentially fluoroform free. The degree of purity of $C_2F_4$ (i.e., freedom from $CHF_3$) depends of course on the number of theoretical plates in section C and by choosing a suitable number of plates, the desired degree of separation may be achieved.

The minimum extractant concentration will be determined with reference to section B, wherein the liquid and vapor are relatively rich in fluoroform and wherein the $$\alpha \frac{CHF_3}{C_2F_4}$$

values are lowest. In section B accordingly the weight ratio of extractant to the binary $C_2F_4+CHF_3$ should be at least 40:60, preferably at least 50:50, but for practical operation generally not over 95:5, in order to obtain a fluoroform overhead relatively low in $C_2F_4$. The preferred weight ratio of extractant to $C_2F_4+CHF_3$, as previously pointed out, is about 50:50 to 85:15. The rate of circulation of extractant required to maintain the desired extractant concentration will depend on a number of factors well known in the art and will of course increase in proportion to the reflux ratio. The reflux ratio in turn depends on various factors such as composition of feed stream, economics, degree of purity desired in the product streams, etc. Typically, reflux ratios of 3:1 to 20:1 will be used.

The optimum operating pressure for the extractive distillation column 19 will depend upon a number of factors. The upper limit of course is set by the critical pressure of fluoroform (701 lbs./in.$^2$ absolute) and must therefore be below that value. Since the relative volatility $$\alpha \frac{CHF_3}{C_2F_3}$$

increases with decreasing temperature as shown by the foregoing data, lower temperatures (and correspondingly lower pressures) are favored from that standpoint. On the other hand, very low temperatures require increasingly expensive refrigeration equipment, thus setting a lower practical limit on the temperature (and corresponding column pressure) that may be used. In general, the column pressure may vary between 75 pounds and 500 lbs./in.$^2$ absolute and preferably between 125 and 400 lbs./in.$^2$ absolute.

Column 25 for stripping $C_2F_4$ from the extractant is conveniently operated at a lower pressure than the extractive distillation column 19 such that liquid will flow from the bottom of column 19 to column 25 by virtue of the pressure differential between them. The considerably higher boiling extractant removed as bottoms from column 25 is cooled in cooler 28 to approximately the boiling temperature of the ternary mixture formed at the point of introduction of the extractant into the extractive distillation column 19 under the prevailing column pressure. Since the relative volatility $$\alpha \frac{C_2F_4}{extractant}$$

is in all cases quite high, substantially quantitative separations of $C_2F_4$ from extractant may be achieved in column 25 without difficulty.

The following illustrates the operation of the system shown in FIGURE 6. The feed mixture is a binary containing 50 mole percent $C_2F_4$ and 50 mole percent $CHF_3$. This mixture is fed into an extractive distillation column containing packing equivalent to about 60 plates at a point about 15 plates from the bottom of the column. The column is maintained at a pressure of about 170 lbs./in.$^2$ absolute with a temperature at the head of the column of about $-26°$ C. and a temperature at the base of the column of about $+32°$ C. Using a reflux ratio of 7 to 1, $C_3F_6$ is fed into the column near the head at a temperature of $-4°$ C. at the rate required to maintain a molar ratio of $C_3F_6$ to $C_2F_4+CHF_3$ of 58:42 in section B of the column, resulting in an extractant circulation rate of 6 parts by weight of extractant per part of $C_2F_4+CHF_3$ feed. The product withdrawn from the head of the column consists of 99.90 mole percent fluoroform and 0.10 mole percent $C_2F_4$. From the bottom of the column a mixture of $C_3F_6$ and $C_2F_4$ is taken off containing about 10 mol percent $C_2F_4$ and less than 0.01 mol percent $CHF_3$. This mixture is taken to a stripping column operating at 125 lbs./in.² absolute where substantially pure $C_2F_4$ is recovered while the $C_3F_6$ extractant is returned to the extractive distillation column after cooling to a temperature of —4° C.

Under slightly modified conditions, similar results are obtained using cyclo-octafluorobutane, trifluorotrichloroethane and carbon tetrachloride extractants.

PREFERRED SYSTEM FOR SEPARATION OF MIXTURES OBTAINED BY THE PYROLYSIS OF FLUOROFORM

An application of major importance for the process of the invention is in the separation of fluoroform and tetrafluoroethylene as obtained in the raw pyrolysate from the pyrolysis of fluoroform. When the pyrolysis (see U.S. Patent 3,009,966) is operated primarily for the production of tetrafluoroethylene, conversion of the fluoroform to tetrafluoroethylene and other products will generally range from 20% to 95%, producing a raw pyrolysate containing hydrogen fluoride and containing in the organic portion from 90% to 10 mole percent fluoroform with the remainder comprising tetrafluoroethylene and other products. The predominant organic co-product of the pyrolysis is hexafluoropropene which is generally present in organic portion of the raw pyrolysate in concentrations ranging from 1 to 25 mole percent at the above total fluoroform conversions. The next most predominant co-product is generally hexafluoroethane $C_2F_6$ which may be present in amounts ranging, e.g., from 0.1 to 10 mole percent in the organic portion of the raw pyrolysate. Other organic co-products which in all may comprise of the order of one or two mol percent of the organic portion may include, e.g., $C_4F_8$ compounds such as octafluorocyclobutane, perfluoroisobutylene, and cis- and trans-$CF_3CF{=}CFCF_3$, $C_4F_6$ compounds such as $CF_3C{\equiv}CCF_3$, and others such as $CF_2{=}CHF$, $CF_2{=}CHCF_3$, $C_2HF_5$, $CF_3CHFCF_3$, and $(CF_3)_3CH$.

In the treatment of this pyrolysate, it is generally desired to recover $C_2F_4$, and in some cases hexafluoropropene in high purity, and to recover fluoroform in reasonably high purity for recycle to the pyrolysis reactor. It has also been found desirable to separate the $C_2F_6$ so that it can be recycled to the pyrolysis since it has been found that the recycle of $C_2F_6$ suppresses the formation of this compound. Separation of the small amounts of the co-products listed above is desirable in order that these products too may be recycled to the reactor to suppress their formation.

While any of the various perhalocarbon extractants coming within the scope of the invention may be employed for the separation of the components of the pyrolysate, hexafluoropropene has a number of important advantages that makes it uniquely suited for this separation. First of all, since hexafluoropropene is produced as a co-product of the pyrolysis it is readily available and in any case must be separated from the pyrolysis product. The introduction of an extraneous material into the pyrolysis product is avoided, thus eliminating an additional distillation operation. Another advantage that has been discovered for hexafluoropropene as the extractant in this separation is that it permits hexafluoroethane, generally present as a co-product in the pyrolysate, to be taken off at the head of the column with the fluoroform rather than at the bottom of the column with the tetrafluoroethylene. This is advantageous for two reasons. First, it eliminates an otherwise difficult separation of $C_2F_4$ from $C_2F_6$ and secondly it permits the $C_2F_6$ to be conveniently recycled together with the fluoroform to the pyrolysis reactor. The recycle of the $C_2F$ to the pyrolysis has been found to be highly advantageous, in that the recycle of the hexafluoroethane suppresses the formation of this material such that the net production of this material in the pyrolysis can be substantially eliminated.

Still another advantage of the use of hexafluoropropene as the extractant in the separation of the raw pyrolysate is that it can be readily separated from a substantial portion of the higher boiling compounds that are formed as co-products in the pyrolysis. This permits in turn these higher boiling materials to be recycled to the pyrolysis reaction resulting in a suppression or reduction of the net rate of formation of these materials.

Figure 7:
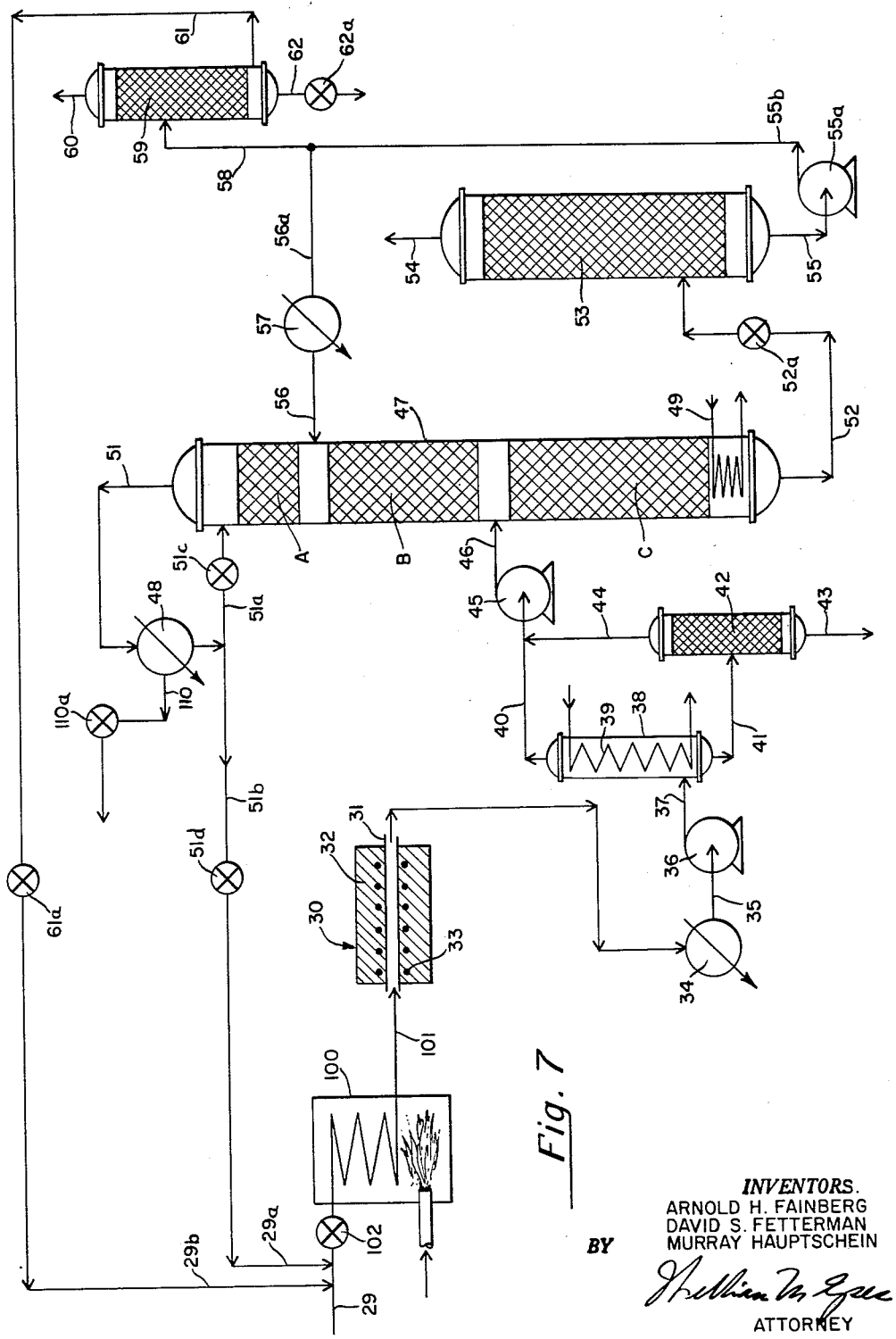

Reference is now made to FIGURE 7 of the drawings which shows schematically a preferred method using hexafluoropropene as the extractant for the treatment of a pyrolysate obtained by the high temperature pyrolysis of fluoroform. A stream of fresh fluoroform feed is conducted by line 29 and valve 102 through a preheater 100, which may, e.g., be gas or oil fired as shown, where the feed is preheated to temperatures of, e.g., 800 to 1000° C., and thence by line 101 into a pyrolysis reactor generally designated by the reference numeral 30. Recycle fluoroform and other products separated from the pyrolysate are introduced by lines 29a and 29b into the fresh fluoroform feed and mixed therewith before flowing through the preheater and into the pyrolysis reactor. The pyrolysis reactor may consist, as shown, of a tube or tubes 31 preferably constructed of, or lined with, platinum, surrounded with thermal insulation material 32 and electrically heated to the desired pyrolysis temperature by electric heating elements 33.

The pyrolysis temperature, pressure and contact time are adjusted (see U.S. Patent 3,009,966) to give the desired ratio of tetrafluoroethylene to hexafluoropropene in the pyrolysis product. Where tetrafluoroethylene is desired as a major product, high temperatures of the order of 850° to 1300° C., relatively low pressures of the order of 25 to 300 mm. Hg absolute and relatively short contact times of the order of 0.5 to 0.0001 second are preferred.

The high temperature stream of pyrolysate leaving the reactor 30 is passed through a cooler 34, conveniently an air cooler, where the pyrolysate vapors are cooled, e.g., approximately to room temperature. The cooled stream is then conducted by line 35 to a vacuum compressor 36 which serves to draw the desired vacuum on the system comprising reactor 30 and cooler 34 so as to thereby maintain the desired reduced pyrolysis pressure, and at the same time serves to compress the pyrolysate to pressures of the order of, e.g., 5 to 75 p.s.i.g. (lbs./sq. in. gage). At such pressure, the pyrolysate is introduced by line 37 into condenser 38 equipped with a cooling coil 39 where the pyrolysate is cooled to temperatures of the order of —20 to +10° C. Under these conditions, the hydrogen fluoride content of the pyrolysate, which generally comprises from 5 to 25 weight percent of the total undergoes condensation resulting in almost quantitative separation of the HF from the organic portion of the pyrolysate as a separate liquid layer. The unexpected substantially quantitative separation of the HF in this manner eliminating as it does the need for distillation facilities for the separation. The selective substantially quantitative condensation of the hydrogen fluoride apparently results from the fact that the hydrogen fluoride and the organic portion of the pyrolysate form two immiscible phases when condensed such that the dew points of the hydrogen fluoride and of the organic portion in the mixture remain the same as the dew point of the two separate components, in contrast to the average dew point obtained where the components of the vapor mixture form a single homogeneous liquid phase.

Relatively high purity hydrogen fluoride containing, e.g., only 0.5 to 2 weight percent of organics is removed by line 41 from the bottom of condenser 38 and introduced to a small stripping column 42 where the small amount of organic material is stripped from the hydrogen fluoride. Substantially pure hydrogen fluoride is withdrawn by line 43 for any desired use. Small amounts of organic material separated from the hydrogen fluoride are withdrawn by line 44 and combined with the major organic portion of the pyrolysate leaving condenser 38 by line 40.

The organic portion of the pyrolysate, now substantially hydrogen fluoride free, is conducted to a compressor 45 where it is compressed to the desired pressure for the extractive distillation operation, preferably between about 125 and 400 lbs./in.$^2$ absolute. The compressed pyrolysate is introduced by line 46 into the extractive distillation column 47 at an intermediate level. Column 47 is equipped with reboiler coil 49 at the base of the column and refrigerated condenser 48 at the top. A stream of hexafluoropropene extractant is introduced somewhat below the top of the column by line 56. Sections A, B and C operate in substantially the manner as previously described. The short section A, above the point of introduction of the extractant prevents the hexafluoropropene extractant from passing out of the column as overhead.

In section B the descending hexafluoropropene extractant in effect strips away $C_2F_4$ from the $CHF_3$ such that the descending liquid becomes progressively richer in $C_2F_4$ and the ascending vapors richer in the $CHF_3$. Unexpectedly, the hexafluoroethane content of the pyrolysate is also separated from the $C_2F_4$ in section B, rising up the column with the fluoroform rather than descending with the $C_3F_6$—$C_2F_4$ mixture. Vapor liquid equilibria measurements for the quaternary system

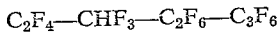

show that the relative volatility of $C_2F_6$ with respect to $C_2F_4$ is substantially in excess of unity, ranging, e.g., from 1.2 to 1.3 at temperatures of $+5$ to $-5°$ respectively for the relatively low concentrations of $C_2F_6$ that are normally encountered in section B of the column (usually from 0.1 to 10 mol percent of the quaternary mixture). This permits virtually complete separation of the $C_2F_6$ from the $C_2F_4$ in the extractive distillation column, the $C_2F_6$ going overhead with the fluoroform. This is of great advantage since it eliminates the necessity for a separate distillation operation to separate a close boiling mixture of $C_2F_4$ and $C_2F_6$. Furthermore, the recycle of the $C_2F_6$ to the pyrolysis reaction (which suppresses the net formation of $C_2F_6$) is facilitated since the $C_2F_6$ is recovered overhead with the fluoroform.

In section C, the descending liquid mixture is progressively enriched in $C_2F_4$ and depleted in $CHF_3$ and $C_2F_6$. The hexafluoropropene content of the feed stream 46 of course travels down the column with the circulating stream of $C_3F_6$ extractant. The higher boiling $C_4F_8$ and $C_4F_6$ compounds comprising a minor fraction of the pyrolysate also travel down the column.

The column overhead removed by line 51 consists predominately of fluoroform with small amounts of $C_2F_6$, e.g., 0.1 to 10 mole percent. It may be substantially free from, or contain varying amounts, e.g., 1 to 10 percent of tetrafluoroethylene. In general, the smaller the amount of tetrafluoroethylene in the overhead stream (which is recycled to the pyrolysis reactor by line 29a) the higher is the net production of tetrafluoroethylene. Recycle of tetrafluoroethylene tends to increase the net production of hexafluoropropene at the expense of tetrafluoroethylene. Thus, the specifications of the overhead stream will vary depending on the desired ratio of end products. When maximum production of tetrafluoroethylene is desired, the amount of tetrafluoroethylene in the overhead should be held to a minimum. However, even in this latter case, it will often be desirable to permit a few percent, e.g., 0.1 to 5% $C_2F_4$ to pass over with the $CHF_3$ since substantial reduction in the height of section B can be realized in this way without greatly affecting the end product distribution.

The overhead vapors from line 51 are passed through condenser 48. A portion of a liquid condensate from condenser 48 is refluxed back to the column by line 51a controlled by valve 51c while a portion is returned by line 51b controlled by valve 51d and by line 29a to the pyrolysis reactor. The ratio of streams 51a and 51b depends, of course, upon the reflux ratio in the column.

Line 110, controlled by valve 110a is provided for the purpose of periodically or continuously venting non-condensables, e.g., oxygen, nitrogen, small amounts of $CF_4$ and the like, from the system. These are preferably vented from the condenser as shown so as to minimize losses of higher boiling material. The elimination of the non-condensables, particularly oxygen, in the column overhead, with the take-off of tetrafluoroethylene in the column bottoms is an important advantage since in this manner, the tetrafluoroethylene is recovered free from oxygen and other non-condensables. As is well known, the presence of oxygen in tetrafluoroethylene particularly in the liquid state is highly disadvantageous since it tends to catalyze the uncontrolled polymerization of tetrafluoroethylene in some cases with explosive violence. In the extractive distillation system of the invention, the tetrafluoroethylene is quantitatively stripped of oxygen and other non-condensables thus eliminating the need for handling oxygen-contaminated tetrafluoroethylene and the necessity for a subsequent separate oxygen removal operation.

The liquid bottoms from column 47 consist of hexafluoropropene and tetrafluoroethylene substantially in the same ratio as the ratio of the respective feed rates of hexafluoropropene by line 56 and tetrafluoroethylene by line 46 to the column. Also in the column bottoms are the small mounts of $C_4$ and higher co-products of the pyrolysis. The distillation conditions may be adjusted so that the column bottoms are essentially fluoroform free, or, if high purity tetrafluoroethylene is not required, they may contain varying residual amounts of fluoroform.

The liquid bottoms from column 47 are withdrawn by line 52 and after passing through pressure let-down valve 52a are introduced into a second column 53, preferably operating at a somewhat lower pressure than column 47, where the tetrafluoroethylene is stripped from hexafluoropropene and other higher boiling products. The tetrafluoroethylene essentially free from, or containing varying residual amounts of fluoroform depending on the product purity desired, is withdrawn by line 54 from the top of the column, while hexafluoropropene and higher boiling materials are withdrawn from the bottom by line 55. One portion of stream 55 is recycled by recycle pump 55a, line 55b, line 56a, cooler 57 and line 56 to the extractive distillation column 47. A second portion of stream 55, the size of which depends upon the rate of production of hexafluoropropene and higher boiling materials, is taken by line 58 to a third distillation column 59 where hexafluoropropene is separated from the higher boiling materials, the hexafluoropropene being taken off at the head of the column by line 60. The bottoms from column 59 comprise principally $C_4$ compounds such as $CF_3C≡CCF_3$, perfluoroisobutylene, cis- and trans-$CF_3CF=CFCF_3$ and cyclo-$C_4F_8$. These compounds may if desired be recycled by line 61, valve 61a, and line 29b to the pyrolysis reactor. The recycle of these components, when they are not desired as end products, is of advantage in that their recycle tends to suppress their net formation. Minor amounts of still higher boiling materials are removed from column 59 by line 62 controlled by valve 62a.

The following example illustrates the operation of the system shown in FIGURE 7 under typical pyrolysis conditions for the production of an end product consisting predominately of tetrafluoroethylene and relatively minor amounts of hexafluoropropene as a co-product.

Makeup fluoroform feed, at the rate of 1.7 lbs./hr., is introduced by line 29, and mixed with two recycle streams:

(a) With a minor recycle stream, line 29b, consisting of a mixture of fluorocarbon compounds boiling higher than $CF_2=CFCF_3$ (including, e.g., $CF_3C≡CCF_3$, CF$_2$=CHCF$_3$, the C$_4$F$_8$ isomers, among others), at the rate of about 0.01 lb./hr.

(b) With a major recycle stream, line 29a, consisting of 98 mol percent fluoroform, 0.5 mol percent tetrafluoroethylene, and 1.5 mol percent hexafluoroethane, at the rate of about 1.0 pound per hour. The mixture is preheated to a temperature of 900° C. (preheater 100) and fed into the pyrolysis reactor consisitng of platinum tubes maintained at a tube temperature of 1250° C. The pyrolysis reactor is maintained at a reduced pressure of 150 mm. Hg absolute with a residence time in the reactor of 0.01 second. The reactor effluent consists of about 48 mole percent hydrogen fluoride, 28 mole percent fluoroform, 20 mole percent tetrafluoroethylene, 3 mole percent hexafluoropropene, and about 1 mole percent C$_2$F$_6$, CF$_3$C≡CCF$_3$, and other by-products. The reactor effluent is passed through an air cooler where it is cooled to a temperature of approximately 100° C. and is then compressed to a pressure of 35 lbs./in.$^2$ absolute and passed to a condenser where it is cooled to a temperature of −25° C. Substantially quantitative removal of the hydrogen fluoride is obtained in this manner. The separated hydrogen fluoride is distilled to remove small amounts of residual organics while the uncondensed organic portion of the pyrolysate is compressed to a pressure of 175 lbs./in.$^2$ absolute and introduced into an extractive distillation column having about 50 theoretical plates at a point approximately 16 plates from the bottom of the column. The extractive column is operated at a pressure of 175 lbs./in.$^2$ absolute, a head temperature of about −25° C. and a base temperature of about +32° C. with a reflux ratio of approximately 7 to 1. With a feed rate of the pyrolysate into the column of about 2.2 pounds per hour, hexafluoropropene extractant is introduced near the top of the column at a temperature of −4° C. at the rate of about 12.4 pounds per hour, resulting in an average weight ratio of C$_3$F$_6$ to CHF$_3$+C$_2$F$_4$ in section B of the column of about 75:25.

The overhead stream from the column consists of approximately 98 mole percent fluoroform, 0.5 mole percent tetrafluoroethylene and 1.5 mole percent hexafluoroethane. The bottoms from the column consist of approximately 90 mole percent C$_3$F$_6$, 10 mole percent C$_2$F$_4$, less than .01 mole percent fluoroform with traces of higher boiling compounds. The bottoms are taken to a second distillation column operating at a pressure of about 125 lbs./in.$^2$ absolute where the tetrafluoroethylene is stripped from the extractant and the higher boiling material, producing a product stream consisting of about 1 lb./hr. tetrafluoroethylene containing less than 0.1 percent of fluoroform.

The bottoms from the second column consisting of over 95 percent C$_3$F$_6$ are removed at the rate of 12.6 pounds per hour. About 12.4 pounds per hour of this stream is recirculated as extractant to a point near the top of the extractive distillation column after cooling to about −4° C. A minor portion of the bottoms from the second column consisting of about 0.2 pound per hour is taken to a third column where the C$_4$F$_8$ compounds and higher boilers are separated from hexafluoropropene, producing a hexafluoropropene product stream at the rate of about 0.2 pound per hour and a higher boiler recycle stream at the rate of about .01 pound per hour for feed back to the pyrolysis reactor.

In this operation, a net yield (based on fresh fluoroform feed) of about 80% tetrafluoroethylene; and about 18% hexafluoropropene is obtained. Through recycle of the hexafluoroethane and other by-products, the net production of hexafluoroethane is reduced essentially to zero while the net yield of other by-products is also substantially reduced.

It is to be understood that with slight modifications, any of the perhalocarbon extractants of the invention may be employed in place of hexafluoropropene in the system of FIGURE 7. For example, if cyclo-C$_4$F$_8$ is used in place of hexafluoropropene as the extractant, the system would operate in a similar manner except that a separate column would be required to separate the hexafluoropropene from the perfluorocyclobutane extractant after separation of the tetrafluoroethylene.

We claim:
1. A method for the separation of a fluoroform-tetrafluoroethylene mixture which comprises the steps of extractively distilling said mixture in the presence of at least 40% by weight of a perhalocarbon extractant in which the halogens are selected from the class consisting of fluorine and chlorine and which has an atmospheric pressure boiling temperature in the range of from −40° C. to +100° C., recovering a fluoroform-rich overhead fraction and a bottoms fraction containing said extractant and tetrafluoroethylene, separating tetrafluoroethylene from said extractant and recycling extractant to said extractive distillation step.

2. A method in accordance with claim 1 in which said perhalocarbon extractant has an atmospheric pressure boiling temperature in the range of from −35° C. to +50° C.

3. A method for the separation of a fluoroform-tetrafluoroethylene mixture which comprises the steps of extractively distilling said mixture in the presence of from 50% to 85% by weight of a perhalocarbon extractant in which the halogens are selected from the class consisting of fluorine and chlorine and which has an atmospheric pressure boiling temperature in the range of from −35° C. to +50° C., recovering a fluoroform-rich overhead fraction and a bottoms fraction containing said extractant and tetrafluoroethylene, separating tetrafluoroethylene from said extractant and recycling extractant to said extractive distillation step.

4. A method for the separation of a fluoroform-tetrafluoroethylene mixture which comprises the steps of extractively distilling said mixture in the presence of at least 40% by weight of a perfluorocarbon extractant having an atmospheric pressure boiling temperature in the range of from −35° C. to +50° C., recovering a fluoroform-rich overhead fraction and a bottoms fraction containing said extractant and tetrafluoroethylene, separating tetrafluoroethylene from said extractant and recycling extractant to said extractive distillation step.

5. A method in accordance with claim 4 in which said perfluorocarbon extractant is hexafluoropropene.

6. A method in accordance with claim 4 in which said perfluorocarbon is perfluorocyclobutane.

7. A method for the separation of a fluoroform-tetrafluoroethylene mixture which comprises the steps of extractively distilling said mixture at a pressure of from 125 to 400 lbs./in.$^2$ absolute in the presence of at least 40% by weight of a perhalocarbon extractant in which the halogens are selected from the class consisting of fluorine and chlorine and which has an atmospheric pressure boiling temperature in the range from −40 to +100° C., recovering a fluoroform-rich overhead fraction and a bottoms fraction containing said extractant and tetrafluoroethylene, separating tetrafluoroethylene from said extractant and recycling extractant to said extractive distillation step.

8. A method for the separation of a fluoroform-tetrafluoroethylene mixture which comprises the steps of extractively distilling said mixture at a pressure of from 125 to 400 lbs./in.$^2$ absolute in the presence of at least 40% by weight of hexafluoropropene, as an extractant, recovering a fluoroform-rich overhead fraction and a bottoms fraction containing said extractant and tetrafluoroethylene, separating tetrafluoroethylene from said extractant and recycling extractant to said extractive distillation step.

9. A method for separating tetrafluoroethylene and fluoroform from the organic portion of a pyrolysate obtained by the pyrolysis of fluoroform and containing principally tetraflruoethylene, fluoroform and hexafluoropropene which comprises the steps of extractively distilling said pyrolysate in a distillation column in the presence of a perhalocarbon extractant in which the halogens are selected from the class consisting of fluoroine and chlorine and which has an atmospheric pressure boiling temperature in the range of from —40 to + 100° C., recovering a fluoroform-rich fraction adjacent the top of the distillation column, recovering a bottoms fraction containing said extractant and tetrafluoroethylene, separating tetrafluoroethylene from said extractant and recycling extractant to said extractive distillation step.

10. A method in accordance with claim 9 in which said perhalocarbon extractant has an atmospheric pressure boiling temperature in the range of from —35 to +50° C.

11. A method for separating tetrafluoroethylene and fluoroform from the organic portion of a pyrolysate obtained by the pyrolysis of fluoroform and containing principally tetrafluoroethylene, fluoroform and hexafluoropropene which comprises extractively distilling said pyrolysate in a distillation column in the presence of at least 40% by weight of a perfluorocarbon extractant having an atmospheric pressure boiling temperature in the range of from —35° C. to +50° C., recovering a fluoroform-rich fraction adjacent the top of the distillation column, recovering a bottoms fraction containing said extractant and tetrafluoroethylene, separating tetrafluoroethylene from said extractant and recycling extractant to said extractive distillation step.

12. A method for separating tetrafluoroethylene and fluoroform from the organic portion of a pyrolysate obtained by the pyrolysis of fluoroform and containing principally tetrafluoroethylene, fluoroform, hexafluoropropene and relatively minor amounts of hexafluoroethane which comprises the steps of extractively distilling said pyrolysate in the presence of at least 40% by weight of hexafluoropropene as an extractant, recovering an overhead fraction enriched in fluoroform and hexafluoroethane, recovering a bottoms fraction containing said extractant and tetrafluoroethylene, separating tetrafluoroethylene from said extractant and recycling extractant to said extractive distillation step.

13. In the production of tetrafluoroethylene by the pyrolysis of fluoroform, the steps of separating hydrogen fluoride from the raw pyrolysate, extractively distilling the remaining organic material consisting pirncipally of tetrafluoroethylene, fluoroform and hexafluoropropene in the presence of at least 40% by weight of a perhalocarbon extractant in which the halogens are selected from the class consisting of fluorine and chlorine and which has an atmospheric pressure boiling temperature ranging from —40° C. to +100° C., thereby substantially separating fluoroform from tetrafluoroethylene as an overhead fraction from said extractive distillation, recycling the separated fluoroform to said pyrolysis, recovering a bottoms fraction containing said extractant and tetrafluoroethylene, separating tetrafluoroethylene from said extractant and recycling extractant to said extractive distillation step.

14. A method in accordance with claim 13 in which said perhalocarbon extractant has an atmospheric pressure boiling temperature in the range of —35° C. to +50° C.

15. In the production of tetrafluoroethylene by the pyrolysis of fluoroform, the steps of separating hydrogen fluoride from the raw prolysate, extractively distilling the remaining organic mixture consisting principally of tetrafluoroethylene, fluoroform and hexafluoropropene in the presence of at least 40% by weight of hexafluoropropene as an extractant, thereby substantially separating fluoroform from tetrafluoroethylene as an overhead fraction from said extractive distillation, recycling the separated fluoroform to said pyrolysis, recovering a bottoms fraction containing said extractant and tetrafluoroethylene, separating tetrafluoroethylene from said extractant and recycling extractant to said etxractive distillation step.

16. In the production of tetrafluoroethylene by the pyrolysis of fluoroform, the steps of separating hydrogen fluoride from the raw pyrolysate, extractively distilling the remaining organic mixture consisting principally of tetrafluoroethylene, fluoroform, hexafluoropropene and minor amounts of hexafluoroethane in the presence of at least 40% by weight of hexafluoropropene as an extractant, recovering an overhead fraction enriched in fluoroform and hexafluoroethane, recycling said overhead fraction to said pyrolysis, and recovering a bottoms fraction containing said extractant and tetrafluoroethylene, separating tetrafluoroethylene from said extractant and recycling extractant to said extractive distillation step.

17. In the production of tetrafluoroethylene by the pyrolysis of fluoroform, the steps of separating hydrogen fluoride from the raw pyrolysate, extractively distilling the remaining organic mixture consisting principally of tetrafluoroethylene, fluoroform, hexafluoropropene and minor amounts of hexafluoroethane in the presence of from about 50% to 85% by weight of hexafluoropropene as an extractant in a distillation column operating at a pressure of from 125 to 400 lbs./in.$^2$ absolute, recovering an overhead fraction consisting essentially of fluoroform and hexafluoroethane and substantially free from tetrafluoroethylene, recycling said overhead fraction to said pyrolysis, recovering a bottoms fraction containing said extractant and tetrafluoroethylene and substantially free from fluoroform and hexafluoroethane, separating tetrafluoroethylene from said extractant and recycling extractant to said extractive distillation step.

References Cited in the file of this patent

UNITED STATES PATENTS

| 2,406,794 | Benning et al. | Sept. 3, 1946 |
| 2,758,138 | Nelson | Aug. 7, 1956 |
| 2,970,176 | Eyck et al. | Jan. 31, 1961 |
| 3,009,966 | Hauptschein et al. | Nov. 21, 1961 |

FOREIGN PATENTS

| 581,217 | Canada | Aug. 11, 1959 |

UNITED STATES PATENT OFFICE
CERTIFICATE OF CORRECTION

Patent No. 3,152,051

October 6, 1964

Arnold H. Fainberg et al.

It is hereby certified that error appears in the above numbered patent requiring correction and that the said Letters Patent should read as corrected below.

Column 1, line 24, for "pyrolystate" read -- pyrolysate --; line 44, for "azetrope" read -- azeotrope --; column 2, line 17, for "fluorform" read -- fluoroform --; column 4, Table II, sixth column, line 1 thereof, for "0.097" read -- 0.907 --; line 57, after "CCl$_2$F$_2$" insert a comma; column 5, Table III, in the title, line 1 thereof, for "VOLATILE" read -- VOLATILITY --; same Table III, in the title, line 2 thereof, for "C$_2$F4" read -- C$_2$F$_4$ --; column 6, lines 11 to 13, the formula should appear as shown below instead of as in the patent:

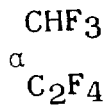

same column 6, Table IV, in the title, line 1 thereof, for "C$_2$F$_4$-CHF-" read -- C$_2$F$_4$-CHF$_3$- --; column 7, line 4, for "C$_2$F$_6$-CHF$_3$-" read -- C$_2$F$_4$-CHF$_3$- --; column 10, lines 26 to 28, the formula should appear as shown below instead of as in the patent:

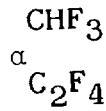

column 11, line 70, for "C$_2$F" read -- C$_2$F$_6$ --; column 14, line 29, for "mounts" read -- amounts --; column 16, line 46, after "perfluorocarbon" insert -- extractant --; column 18, line 5, for "prolysate" read -- pyrolysate --; line 15, for "etxractive" read -- extractive --.

Signed and sealed this 23rd day of March 1965.

(SEAL)
Attest:

ERNEST W. SWIDER
Attesting Officer

EDWARD J. BRENNER
Commissioner of Patents